United States Patent
Sabotta et al.

(10) Patent No.: US 9,631,726 B2
(45) Date of Patent: Apr. 25, 2017

(54) SEALING MEMBER WITH VISIBLE PRESSURE AND TEMPERATURE INDICATION

(71) Applicant: Caterpillar Inc., Peoria, IL (US)

(72) Inventors: Christian Earl Sabotta, Washington, IL (US); Sarah Talbot Flanigan, Dunlap, IL (US); Jay Hamilton Cline, Hopewell, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/798,724

(22) Filed: Jul. 14, 2015

(65) Prior Publication Data

US 2017/0016539 A1    Jan. 19, 2017

(51) Int. Cl.
  *F16J 15/06* (2006.01)
  *F16J 15/02* (2006.01)
  *G01K 11/12* (2006.01)
  *G01L 1/24* (2006.01)

(52) U.S. Cl.
  CPC ............ *F16J 15/02* (2013.01); *G01K 11/12* (2013.01); *G01L 1/24* (2013.01)

(58) Field of Classification Search
  CPC ..... F16J 15/064; F16J 15/3296; F16J 15/3492
  See application file for complete search history.

(56) References Cited

U.S. PATENT DOCUMENTS

| | | | |
|---|---|---|---|
| 4,046,387 A | 9/1977 | Lee | |
| 4,339,207 A * | 7/1982 | Hof | G01K 13/002 116/217 |
| 4,362,645 A * | 12/1982 | Hof | G01K 13/002 116/201 |
| 4,391,662 A | 7/1983 | Mauthe | |
| 4,818,620 A | 4/1989 | Pilkington | |
| 5,971,399 A * | 10/1999 | Hashimoto | F16L 23/22 277/314 |
| 6,264,033 B1 | 7/2001 | Kannabiran et al. | |
| 7,278,369 B2 | 10/2007 | Kelley et al. | |
| 7,364,357 B2 | 4/2008 | Wu | |
| 2003/0140999 A1 | 7/2003 | Smith et al. | |

(Continued)

FOREIGN PATENT DOCUMENTS

| | | |
|---|---|---|
| JP | 52-118118 | 10/1977 |
| JP | 02300566 A * | 12/1990 |

(Continued)

*Primary Examiner* — Gilbert Lee
(74) *Attorney, Agent, or Firm* — Finnegan, Henderson, Farabow, Garrett & Dunner, LLP

(57) ABSTRACT

A sealing member for a machine may include an elastomeric body configured to fit at least partially into a recess defined in at least one of two sealing surfaces of two mating parts of the machine. The elastomeric body may include a visible indicator portion extending out from between the two mating parts. The elastomeric body may further include an elastomeric compound, and at least one of a thermochromic dye and a piezochromic dye mixed into the elastomeric compound, wherein the thermochromic dye is adapted to change color upon exposure of the elastomeric body to a temperature above a threshold temperature, and the piezochromic dye is adapted to change color upon exposure of the elastomeric body to a pressure above a threshold pressure.

16 Claims, 1 Drawing Sheet

(56) References Cited

U.S. PATENT DOCUMENTS

| | | | |
|---|---|---|---|
| 2008/0280040 A1* | 11/2008 | Barrall | F16J 15/104 |
| | | | 427/256 |
| 2012/0174853 A1 | 7/2012 | Wilson | |
| 2014/0131952 A1 | 5/2014 | Kirov et al. | |
| 2015/0338297 A1* | 11/2015 | Manahan | G01L 5/00 |
| | | | 116/203 |
| 2016/0076682 A1* | 3/2016 | Conrad | B29C 65/18 |
| | | | 285/21.1 |

FOREIGN PATENT DOCUMENTS

| | | |
|---|---|---|
| WO | 9606643 | 3/1996 |
| WO | WO 2014/091183 | 6/2014 |

* cited by examiner

SEALING MEMBER WITH VISIBLE PRESSURE AND TEMPERATURE INDICATION

TECHNICAL FIELD

The present disclosure relates generally to a sealing member and, more particularly, to a sealing member with visible temperature and pressure indication.

BACKGROUND

Machines such as dozers, loaders, excavators, backhoes, motor graders, and other types of heavy equipment typically include stationary and moving parts, and one or more hydraulic actuators to accomplish a variety of tasks. Sealing members are often provided between two or more of the stationary and moving parts in order to retain fluids that provide lubrication, cooling, and/or a hydraulic pressure source for the hydraulic actuators. These sealing members may be exposed to high pressures and/or temperatures, which may lead to deterioration, and eventual failure of the sealing members. Failure of a sealing member resulting from exposure to pressures and/or temperatures in excess of predetermined thresholds may result in damage to components of the machine and considerable down time for the machine while damaged components are repaired or replaced.

One example of a sealing arrangement used in machines such as the machines described above may include press-in-place (PIP) seals provided as cylinder head gaskets and/or cylinder liner sealing arrangements. A cylinder head gasket is typically provided between the cylinder block and the cylinder head. The cylinder head gasket may be in the form of one continuous element, or in the form of several elements. Ring-shaped seals may also be provided to conform approximately to the outer dimensions of each of the respective cylinder liners provided around each cylinder in the cylinder block. The cylinder liner ring seals prevent coolant from weeping upwards through the metal press fit between each cylinder liner and the cylinder block, and also prevent combustion gases or excess gases from a natural gas intake manifold, for example, from mixing with the coolant.

Another example of a sealing arrangement found in machines may include axial face seals that are used to seal two relatively rotating bodies against each other. These face seals keep dirt and other contamination from reaching sensitive parts of a machine, such as bearings, and retain fluids within fluid-filled housings. Face seals may include two highly polished metal rings facing each other and rotating relative to each other. Each of the face seals may be respectively supported by resilient elastomeric rings that can be compressed in order to prevent fluids from leaking around the face seals, and to allow the face seals to align with each other. In all of the various sealing arrangements, the elastomeric sealing members must be able to withstand high temperatures and pressures for extended periods of time without deterioration.

A problem with conventional sealing arrangements is that the sealing members are typically completely encased between mating parts of the machine, and are not readily observable in order to determine whether they are still in good condition. Generally, a failure of a sealing member is only discovered after fluids begin to leak out from between parts of the machine, fluid pressures required for proper operation of the machine drop, or there is a catastrophic failure of one or more parts of the machine. A decrease in the structural integrity of a sealing member, or a catastrophic failure of the seal may result in one or more parts of the machine no longer receiving proper lubrication or cooling. Damage to the parts may result, requiring the replacement of the parts and down time for the machine.

One attempt to provide a visible indicator when a rubber product has been exposed to a temperature that may be detrimental to the product's performance or safety is disclosed in U.S. Pat. No. 7,278,369 to Kelley et al. ("the '369 patent"). The '369 patent provides a temperature indicator for a rubber article comprising a thermochromic material, wherein the rubber article is selected from the group consisting of tires, belts and hoses. A thermochromic material is compounded with an elastomeric compound to form an elastomeric temperature indicator. The thermochromic material changes color at a predetermined temperature, thereby providing a visual indicator that the temperature has risen to a level likely to cause permanent damage to the rubber article.

Although the temperature indicator of the '369 patent provides a temperature indicator for tires, belts and hoses, it does not provide a way for visually monitoring whether a sealing member positioned between two machine parts has exceeded a predetermined threshold temperature or pressure.

The disclosed sealing member is directed to overcoming one or more of the problems set forth above and/or other problems of the prior art.

SUMMARY

One aspect of the present disclosure is directed to a sealing member for a machine. The sealing member may include an elastomeric body configured to be press fit at least partially into a recess defined in at least one of two sealing surfaces of two mating parts of the machine. The elastomeric body may include a visible indicator portion extending out from between the two mating parts. The elastomeric body may further include an elastomeric compound, and at least one of a thermochromic dye and a piezochromic dye mixed into the elastomeric compound, wherein the thermochromic dye is adapted to change color upon exposure of the elastomeric body to a temperature above a threshold temperature, and the piezochromic dye is adapted to change color upon exposure of the elastomeric body to a pressure above a threshold pressure.

Another aspect of the present disclosure is directed to a sealed sub-assembly of a machine. The sealed sub-assembly may include a first machine part, the first machine part having a first sealing surface, and a second machine part configured to mate with the first machine part, the second machine part having a second sealing surface. An elastomeric body may be configured to be retained between the first and second sealing surfaces. The elastomeric body may include a visible indicator portion extending out from between the two machine parts, an elastomeric compound, and at least one of a thermochromic dye and a piezochromic dye mixed into the elastomeric compound. The thermochromic dye may be adapted to change color upon exposure of the elastomeric body to a temperature above a threshold temperature, and the piezochromic dye may be adapted to change color upon exposure of the elastomeric body to a pressure above a threshold pressure.

Still another aspect of the present disclosure is directed to a method of maintaining a sealed interface between two mating parts of a machine. The method may include assembling the two mating parts with a sealing member positioned between two surfaces of the two mating parts of the machine. The sealing member may be formed with an elastomeric body including a visible indicator portion extending out from between the two mating parts. The elastomeric body may also include an elastomeric compound, and at least one of a thermochromic dye and a piezochromic dye mixed into the elastomeric compound, wherein the thermochromic dye is adapted to change color upon exposure of the elastomeric body to a temperature above a threshold temperature, and the piezochromic dye is adapted to change color upon exposure of the elastomeric body to a pressure above a threshold pressure. The method may further include receiving an indication of a color change of the visible indicator portion correlating to the elastomeric body having been exposed to at least one of a temperature above a threshold temperature and a pressure above a threshold pressure, disassembling the two mating parts, removing the elastomeric body from between the two mating parts, and replacing the elastomeric body with another elastomeric body.

DETAILED DESCRIPTION

Figure 1:
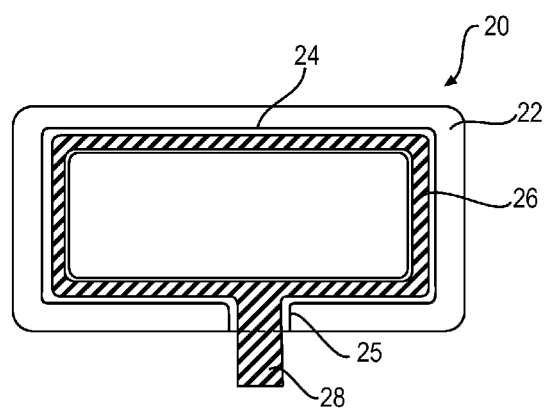
FIG. 1 is a diagrammatic illustration of an exemplary sealing member positioned on a machine part.

FIG. 1 illustrates an exemplary sealing member 26 positioned at least partially in a groove 24 defined in a sealing face 22 of a machine part 20. A mating machine part (not shown) may be placed on top of the part 20 during assembly, and clamped down onto the sealing face 22, resulting in the application of a predetermined amount of compression to the sealing member 26. The cross-sectional configuration of the sealing member 26 may have different shapes, depending on the particular application, and the groove 24 may be configured to provide a press fit or a loose fit against side walls of the sealing member. In various exemplary configurations, the sealing member 26 may have a substantially circular configuration, a rectangular configuration, a D-shaped configuration, a U-shaped configuration, a L-shaped configuration, a trapezoidal configuration, or any other configuration designed to enable the sealing member to provide a desired seal against the passage of fluids. The compression that the sealing member 26 is exposed to may be set to an initial desired pressure that is a function of the clamping force applied to the mating parts. However, the pressures and temperatures that the sealing member is exposed to may vary during operation of the machine depending on a number of factors, including the operating temperatures, changes in the performance of hydraulic pumps providing pressurized hydraulic fluid to various reservoirs, changes in the temperatures and pressures of gaseous fuels, expansion and contraction of fastening members and other structural components, and wear and tear on the various parts. Under certain operating conditions, the sealing member 26 may be exposed to temperatures and/or pressures that exceed safe threshold temperatures and/or pressures for the particular elastomeric materials from which the sealing member is made. Early detection of these circumstances where the sealing member threshold temperatures and/or pressures have been exceeded may allow for replacement of the sealing member before the structural integrity of the sealing member has been damaged, and before leakage of fluids past a damaged sealing member potentially results in more serious damage to other parts of the machine.

The composition of the sealing member 26 may include a high performance elastomeric compound capable of withstanding the high temperatures and pressures it may be exposed to during normal operation of the machine. Examples of the elastomeric compound may include fluoropolymers, tetrafluoroethylene-propylene, peroxide cured fluorocarbon, nitrile, neoprene, butyl, and silicone. As shown in FIG. 1, the sealing member 26 may be provided with a visible indicator portion 28 configured to protrude through an access channel 25 formed in the sealing surface 22 of the machine part 20. The visible indicator portion 28 may be configured to protrude far enough from the access channel 25 to be in a position that is visible to an operator or an optical detection device when the part 20 is assembled with its mating part or parts, and the machine is operational. In various alternative embodiments, the sealing member 26 may be positioned between two sealing surfaces 22 of a machine part or parts, without the need for a groove 24 and/or an access channel 25 in one or both of the parts. The visible indicator portion 28 may still be configured to protrude far enough from between the mating machine parts to be visible to an operator or an optical detection device. The visible indicator portion 28 may be formed in any number of different configurations, depending on the parts that are being sealed by the sealing member 26 and the accessibility of the parts for observation. The purpose of the visible indicator portion 28 is to provide an easily observable extension of the sealing member 26 that will allow for visual confirmation of the condition of the sealing member without having to disassemble the parts between which the sealing member is located. In various alternative configurations, a visible indicator portion of a sealing member may be an integral portion of the sealing member that protrudes in a radial and/or axial direction from the sealing portion of the sealing member through an opening or recess specially provided in the mating machine parts, or through existing gaps or other openings between machine parts to an observable location. The visible indicator portion may be positioned such that an optical detection device may be placed in line-of-sight with the visible indicator portion and produce signals indicative of any change in color or visual appearance of the visible indicator portion. In addition or alternatively, the visible indicator portion may be positioned to allow observation by an operator of the machine, or a service technician.

The composition of the elastomeric compound for the sealing member 26 may further include at least one of a thermochromic dye and a piezochromic dye. A thermochromic dye may provide a visible indication that a temperature of the sealing member 26 has exceeded a threshold temperature or range of temperatures, such as by changing color. A piezochromic dye may provide a visible indication that a pressure to which the sealing member has been exposed exceeded a threshold pressure or range of pressures, such as by changing color. In some embodiments, the thermochromic and/or piezochromic dyes may undergo an irreversible color change when the elastomeric compound containing the thermochromic and/or piezochromic dyes has been exposed to a temperature and/or pressure that may have caused permanent damage to the sealing member. In other embodiments, the color change may be reversible if the sealing member has not been exposed to temperatures and/or pressures in excess of thresholds for more than a certain length of time, or if the temperatures and/or pressures fall within a certain range. The color change may include changing from colorless to a distinct color, from a distinct color to colorless, or from one distinct color to another.

In some exemplary implementations of this disclosure, only a thermochromic dye may be added to an elastomeric compound to be molded into a desired sealing member. In other implementations, only a piezochromic dye may be added to the elastomeric compound. In still further implementations, both thermochromic and piezochromic dyes may be added to the elastomeric compound, which is then molded into a desired sealing member. In the implementations with both thermochromic and piezochromic dyes added to the same sealing member, a first color may result from the sealing member being exposed to temperatures above a certain threshold, a second color may result from the sealing member being exposed to pressures above a certain threshold, and a third color may result from the sealing member being exposed to both temperatures and pressures above certain thresholds. The third color may be a result of a combination of color changes caused by both the thermochromic and piezochromic dyes.

Figure 2:
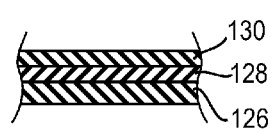
FIG. 2 is a cross-sectional illustration of one exemplary embodiment of a sealing member according to this disclosure.

In the exemplary implementation illustrated in FIG. 2, the thermochromic and/or piezochromic dyes may be added to flexible coatings, which may then be applied over an existing sealing component without having to manufacture a completely new sealing component containing the thermochromic and/or piezochromic dyes. This implementation may enable cost effective modification of existing sealing components or after-market sealing components to add the features of visible temperature and/or pressure indication. The flexible coatings may also be made from elastomeric compounds having a high level of elasticity and capable of withstanding the high temperatures and pressures that may occur during normal operation of the machine. As shown in the cross sectional view of FIG. 2, an existing sealing component 126 may be coated with a first, bottom layer 128 of a flexible coating containing a thermochromic dye, and a second, top layer 130 of a flexible coating containing a piezochromic dye. The flexible coating layers 128, 130 may flex with the sealing component 126 without cracking or separating from the sealing component, and may be exposed to the same temperatures and pressures affecting the sealing component when the sealing component is installed between two or more machine parts.

In various alternative implementations, a single layer of flexible coating may include both thermochromic and piezochromic dyes, and as discussed above with regard to a modified elastomeric compound, may assume different colors depending on the temperatures and pressures to which it is exposed. In the exemplary implementation shown in FIG. 2, the top flexible coating layer 130 may include either a thermochromic dye or a piezochromic dye that changes to a transparent, colorless mode when exposed to temperatures or pressures, respectively, in excess of threshold values, allowing visual observation of the bottom flexible coating layer 128. A determination of which flexible coating layer to place on top of another flexible coating layer may be a function of which parameter is likely to affect the sealing component first, a pressure or a temperature in excess of an acceptable threshold. For example, if it is known that a sealing component is likely to be exposed to pressures in excess of acceptable thresholds before being exposed to temperatures in excess of acceptable thresholds, the top flexible coating layer 130 may be provided with a piezochromic dye that changes to a transparent, colorless mode when exposed to pressures above a threshold. After the top coating layer 130 has changed to a transparent, colorless mode, the bottom coating layer 128 becomes visible, enabling visual confirmation of whether the sealing member has also been exposed to temperatures above a threshold. Other strategies for determining the characteristics of multiple flexible coating layers applied to a sealing component may also be based on whether the sealing component is more sensitive to temperatures or pressures in excess of predetermined thresholds. The visually confirmed information on temperatures and/or pressures to which the sealing component 126 has been exposed may enable a determination of whether the sealing component should be replaced before it suffers a detrimental change to structural integrity.

In some alternative implementations, a sealing component positioned between two or more machine parts may include a first flexible coating layer over a first portion of the sealing component including a first visible indicator portion extending from the sealing component at one location, and a second flexible coating layer over a second portion of the sealing component including a second visible indicator portion extending from the sealing component at a second location. The first coating layer may be provided with only a thermochromic dye, for example, for indication of exposure of at least the first portion of the sealing component to a temperature in excess of a first threshold, and the second coating layer may be provided, for example, with only a piezochromic dye for indication of exposure of at least the second portion of the sealing component to a pressure in excess of a second threshold.

In various alternative implementations, the flexible coating layers may be applied to the sealing component 126 over distinct portions of the sealing component, such as by alternating a strip of flexible coating containing a thermochromic dye with a strip of flexible coating containing a piezochromic dye. The flexible coatings may be applied in one or more layers over an elastomeric or metallic sealing component by spraying, brushing, or dipping of all or portions of the sealing component with the flexible coating. Portions of the sealing component may be masked during application of a flexible coating containing one of a thermochromic or piezochromic dye. The mask may be removed from the uncoated portions, and reapplied if necessary over the portions that have been coated to allow application of a flexible coating containing the other of a thermochromic or piezochromic dye to the remaining portions of the sealing component.

Figure 3:
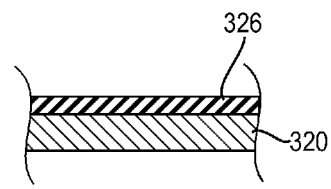
FIG. 3 is a cross-sectional illustration of another exemplary embodiment of a sealing member according to this disclosure.

FIG. 3 illustrates an alternative implementation wherein a metallic sealing member 320, such as a precision-machined face seal, includes an elastomeric body attached to one side of the metallic sealing member 320. In the illustrated exemplary implementation, the metallic sealing member 320 may be coated on one side with a flexible coating layer 326, which may contain one or both of a thermochromic dye and a piezochromic dye. The flexible coating layer 326 may form the elastomeric body, and may be applied to the surface of the metallic sealing member 320 opposite from the precision-machined, sealing surface. The coating layer 326 may support the metallic sealing member 320 within a recess in a machine part in order to provide a leak-proof seal between the sealing member 320 and the recess. The coating layer 326 may also be flexible enough to compensate for slight misadjustment between the recess in which the sealing member 320 is mounted, the sealing member 320 itself, and an opposing, rotating face seal. If the sealing member 320 is exposed to temperatures or pressures in excess of safe operating thresholds, the coating layer 326 may change to different colors depending on which thresholds have been exceeded. Although only one coating layer 326 is shown in FIG. 3, one of ordinary skill in the art will recognize that multiple coating layers having the same or different elastomeric compounds with one or more of thermochromic and piezochromic dyes may be included.

INDUSTRIAL APPLICABILITY

The disclosed sealing member with visible temperature and/or pressure indicating features may have applicability in any machine where it would be useful to be able to readily monitor the condition of seals. Sealing members are often positioned between stationary and/or moving machine parts where the only way to check on the condition of the sealing members is to completely disassemble the machine parts. A sealing member that has been exposed to temperatures and/or pressures in excess of certain thresholds may experience a deterioration in structural integrity, which may result in failure of the seal. A failed seal may result in the loss of lubrication between parts, and leakage of fluids such as fuel, coolants, and hydraulic fluids required for the operation of hydraulic actuators. The effects of a damaged or deteriorating seal may be immediate, resulting in a catastrophic failure of various machine parts, or more gradual, resulting in changes in various operational characteristics such as fuel efficiency, power output, cooling efficiency, emissions levels, and responsiveness of the machine to operator commands. Therefore, a readily observable indication that a sealing member has been exposed to temperatures and/or pressures in excess of certain thresholds may provide an early warning of potential problems.

Any of the disclosed sealing member implementations may be applicable in a method for maintaining a sealed interface between two or more mating parts of a machine. The method for maintaining a sealed interface may include assembling the two or more mating parts with a sealing member positioned between two surfaces of the two mating parts. In some embodiments, the method may include assembling the two or more mating parts with the sealing member positioned at least partially in a recess defined in at least one of two sealing surfaces of the two mating parts of the machine. As discussed above, various alternative implementations may include a sealing member configured to be retained between two or more mating parts without the need for a recess defined in one or both of the sealing surfaces. The sealing member may be formed with an elastomeric body including a visible indicator portion extending out from between the two mating parts. The elastomeric body may also include an elastomeric compound, and at least one of a thermochromic dye and a piezochromic dye mixed into the elastomeric compound, wherein the thermochromic dye is adapted to change color upon exposure of the elastomeric body to a temperature above a threshold temperature, and the piezochromic dye is adapted to change color upon exposure of the elastomeric body to a pressure above a threshold pressure. The method may further include receiving an indication of a color change of the visible indicator portion correlating to the elastomeric body having been exposed to at least one of a temperature above a threshold temperature and a pressure above a threshold pressure. The indication of a color change may be observed by an operator or technician, or may be detected by an optical detection device positioned in line-of-sight of the visible indicator portion. Detection of an indicative color change may result in an alarm, display of a status indicator on an operator display, and/or implementation of instructions to change the sealing member within a certain time interval. The method of maintaining a properly sealed interface between the two or more mating parts of the machine may further include disassembling the two mating parts, removing the elastomeric body from between the two mating parts, and replacing the elastomeric body with another elastomeric body.

It will be apparent to those skilled in the art that various modifications and variations can be made to the disclosed sealing member and method for maintaining a sealed interface between two or more mating parts of a machine. Other embodiments will be apparent to those skilled in the art from consideration of the specification and practice of the disclosed apparatus and method. It is intended that the specification and examples be considered as exemplary only, with a true scope being indicated by the following claims and their equivalents.

What is claimed is:

1. A sealing member for a machine, comprising:
an elastomeric body configured to fit at least partially into a recess defined in at least one of two sealing surfaces of two mating parts of the machine, the elastomeric body including:
a visible indicator portion extending out from between the two mating parts;
an elastomeric compound;
a thermochromic dye; and
a piezochromic dye,
wherein the thermochromic dye is adapted to change color upon exposure of the elastomeric body to a temperature above a threshold temperature, and the piezochromic dye is adapted to change color upon exposure of the elastomeric body to a pressure above a threshold pressure.

2. The sealing member of claim 1, wherein the elastomeric body includes a flexible coating applied to a sealing component configured for engagement between the two sealing surfaces of the two mating parts of the machine.

3. The sealing member of claim 2, wherein the flexible coating includes at least two layers applied to the sealing component.

4. The sealing member of claim 3, wherein one of the at least two layers applied to the sealing component includes the thermochromic dye, and another of the at least two layers includes the piezochromic dye.

5. The sealing member of claim 4, wherein the change in color of at least one of the thermochromic dye or the piezochromic dye upon exposure of the elastomeric body to a temperature above the threshold temperature or a pressure above the threshold pressure results in a second of the at least two layers that is applied to the sealing component over a first of the at least two layers becoming colorless and transparent so that a change in color of the first of the at least two layers is also visible.

6. The sealing member of claim 1, wherein the change in color of at least one of the thermochromic dye or the piezochromic dye is irreversible.

7. The sealing member of claim 1, wherein the change in color of at least one of the thermochromic dye or the piezochromic dye is reversible.

8. The sealing member of claim 1, wherein the thermochromic dye and the piezochromic dye are mixed into the elastomeric compound.

9. A sealed sub-assembly of a machine, the sealed sub-assembly comprising:
a first machine part, the first machine part having a first sealing surface;

a second machine part configured to mate with the first machine part, the second machine part having a second sealing surface; and an elastomeric body configured to be retained between the first and second sealing surfaces, the elastomeric body including:
- a visible indicator portion extending out from between the two machine parts;
- an elastomeric compound;
- a thermochromic dye; and
- a piezochromic dye,
  wherein the thermochromic dye is adapted to change color upon exposure of the elastomeric body to a temperature above a threshold temperature, and the piezochromic dye is adapted to change color upon exposure of the elastomeric body to a pressure above a threshold pressure.

10. The sealed sub-assembly of claim 9, wherein the elastomeric body includes a flexible coating applied to a sealing component configured for engagement between the two sealing surfaces of the two mating parts of the machine.

11. The sealed sub-assembly of claim 10, wherein the flexible coating includes at least two layers applied to the sealing component.

12. The sealed sub-assembly of claim 11, wherein one of the at least two layers applied to the sealing component includes the thermochromic dye, and another of the at least two layers includes the piezochromic dye.

13. The sealed sub-assembly of claim 12, wherein the change in color of at least one of the thermochromic dye or the piezochromic dye upon exposure of the elastomeric body to a temperature above the threshold temperature or a pressure above the threshold pressure results in a second of the at least two layers that is applied to the sealing component over a first of the at least two layers becoming colorless and transparent so that a change in color of the first of the at least two layers is also visible.

14. The sealed sub-assembly of claim 9, wherein the change in color of at least one of the thermochromic dye or the piezochromic dye is irreversible.

15. The sealed sub-assembly of claim 9, wherein the thermochromic dye and the piezochromic dye are mixed into the elastomeric compound.

16. A method of maintaining a sealed interface between two mating parts of a machine, the method comprising:
- assembling the two mating parts with an elastomeric body positioned between two surfaces of the two mating parts of the machine, the elastomeric body including:
  - a visible indicator portion extending out from between the two mating parts;
  - an elastomeric compound;
  - at least one of a thermochromic dye; and
  - a piezochromic dye,
    wherein the thermochromic dye is adapted to change color upon exposure of the elastomeric body to a temperature above a threshold temperature, and the piezochromic dye is adapted to change color upon exposure of the elastomeric body to a pressure above a threshold pressure;
- receiving an indication of a color change of the visible indicator portion correlating to the elastomeric body having been exposed to at least one of a temperature above a threshold temperature and a pressure above a threshold pressure;
- disassembling the two mating parts and removing the elastomeric body from between the two mating parts; and
- replacing the elastomeric body with another elastomeric body.

* * * * *